(12) United States Patent
Paila (10) Patent No.: US 8,819,702 B2
(45) Date of Patent: Aug. 26, 2014

(54) FILE DELIVERY SESSION HANDLING

(75) Inventor: Toni Paila, New York, NY (US)

(73) Assignee: Nokia Corporation, Espoo (FI)

(*) Notice: Subject to any disclaimer, the term of this patent is extended or adjusted under 35 U.S.C. 154(b) by 1337 days.

(21) Appl. No.: 11/575,396

(22) PCT Filed: Aug. 31, 2005

(86) PCT No.: PCT/IB2005/052851
§ 371 (c)(1),
(2), (4) Date: Oct. 31, 2007

(87) PCT Pub. No.: WO2006/030337
PCT Pub. Date: Mar. 23, 2006

(65) Prior Publication Data
US 2008/0115148 A1    May 15, 2008

(30) Foreign Application Priority Data
Sep. 15, 2004   (GB) .................................. 0420531.6

(51) Int. Cl.
*G06F 9/44*      (2006.01)
*G06F 17/00*     (2006.01)
(52) U.S. Cl.
USPC .......................................... 719/316; 715/200
(58) Field of Classification Search
None
See application file for complete search history.

(56) References Cited

U.S. PATENT DOCUMENTS

| | | | |
|---|---|---|---|
| 6,226,655 B1 | 5/2001 | Borman et al. | |
| 6,317,784 B1 | 11/2001 | Mackintosh et al. | |
| 7,246,313 B2 * | 7/2007 | Sung et al. | 715/202 |
| 2001/0013068 A1 | 8/2001 | Klemets et al. | |
| 2001/0040900 A1 * | 11/2001 | Salmi et al. | 370/487 |
| 2002/0087569 A1 | 7/2002 | Fischer et al. | |
| 2002/0140744 A1 | 10/2002 | Kanevsky et al. | |
| 2002/0170066 A1 | 11/2002 | Liu | |
| 2004/0201610 A1 * | 10/2004 | Rosen et al. | 345/731 |
| 2005/0223098 A1 * | 10/2005 | Rimac et al. | 709/227 |
| 2006/0256130 A1 * | 11/2006 | Gonzalez | 345/619 |

FOREIGN PATENT DOCUMENTS

| | | |
|---|---|---|
| JP | 2004086743 | 3/2004 |
| WO | WO 00/13080 | 3/2000 |
| WO | WO-01/31497 | 5/2001 |
| WO | WO-02/05089 | 1/2002 |
| WO | WO-03/052626 | 6/2003 |

OTHER PUBLICATIONS

Paila et al. "FLUTE—File Delivery over Unidirectional Transport draft-ietf-rmt-flute-07.txt" Dec. 2003 Interrnet Society pp. 1-33.*
Search Report for UK Patent Application No. GB0424724.3.

(Continued)

Primary Examiner — Charles E Anya
(74) Attorney, Agent, or Firm — Banner & Witcoff, Ltd.

(57) ABSTRACT

Embodiments described herein may include sending transport objects that include content; sending presentation objects that include instructions for providing a presentation of the content; and sending a delivery object that lists at least one of transport object and indicates the content of the transport object. In some embodiments the delivery object may include data identifying the presentation objects; the instructions may include a start time and an end time for the presentation of the content, and a receiver class identifier indicating a group of targeted receivers that have particular receiver capability factors. Some embodiments may include in response to receiving the presentation objects, selecting one of the presentation objects at least partly based on the terminal class identifier; and providing a presentation of the content as defined by the selected presentation object.

20 Claims, 5 Drawing Sheets

(56) References Cited

OTHER PUBLICATIONS

Supplementary European Search Report for European Application No. 05781439.4 dated Jul. 23, 2009.

Paila, T., et al. "FLUTE—File Delivery Over Unidirectional Transport; draft-ieft-rmt-flute-08.txt." IEFT Standard-Working Draft, Internet Engineering Task Force, vol. rmt, No. 8, Jun. 5, 2004.

* cited by examiner

Figure 6

FILE DELIVERY SESSION HANDLING

FIELD OF THE INVENTION

The invention relates generally to resource delivery over digital communication systems.

BACKGROUND OF THE INVENTION

FLUTE is a project managed under the control of the Internet Engineering Task Force (IETF). FLUTE defines a protocol for the unidirectional delivery of files over the Internet. The protocol is particularly suited to multicast networks, although the techniques are similarly applicable for use with unicast addressing. The FLUTE specification builds on Asynchronous Layered Coding (ALC), the base protocol designed for massively scalable multicast distribution. ALC defines transport of arbitrary binary objects, and is laid out in Luby, M., Gemmell, J., Vicisano, L., Rizzo, L. and J. Crowcroft, "Asynchronous Layered Coding (ALC) Protocol Instantiation", RFC 3450, December 2002. For file delivery applications, the mere transport of objects is not enough. The end systems need to know what do the objects actually represent. FLUTE provides a mechanism for signalling and mapping the properties of files to concepts of ALC in a way that allows receivers to assign those parameters for received objects. In FLUTE, 'file' relates to an 'object' as discussed in the above-mentioned ALC paper.

In a FLUTE file delivery session, there is a sender, which sends the session, and a number of receivers, which receive the session. A receiver may join a session at an arbitrary time. The session delivers one or more abstract objects, such as files. The number of files may vary. Any file may be sent using more than one packet. Any packet sent in the session may be lost.

FLUTE has the potential be used for delivery of any file kind and any file size. FLUTE is applicable to the delivery of files to many hosts, using delivery sessions of several seconds or more. For instance, FLUTE could be used for the delivery of large software updates to many hosts simultaneously. It could also be used for continuous, but segmented, data such as time-lined text for subtitling, thereby using its layering nature inherited from ALC and LCT to scale the richness of the session to the congestion status of the network. It is also suitable for the basic transport of metadata, for example SDP files which enable user applications to access multimedia sessions. It can be used with radio broadcast systems, as is expected to be particularly used in relation to IPDC (Internet Protocol Datacast) over DVB-H (Digital Video Broadcast—Handheld), for which standards currently are being developed.

A programming language for choreographing multimedia presentations where audio, video, text and/or graphics can be combined in real time has been developed. The language is called Synchronised Multimedia Integration Language (SMIL, pronounced in the same way as 'smile') is documented at www.w3c.org/audiovideo. SMIL allows a presentation to be composed from several components that are accessible from URLs, as files stored on a webserver. The begin and end times of the components of a presentations are specified relative to events in other media components. For example, in a slide show, a particular slide (a graphic component) is displayed when a narrator in an audio component begins to discuss it.

The inventor has considered the possibility of using a file delivery protocol such as FLUTE for the remote provision of multimedia presentations, such as those written in SMIL. However, the combination of file delivery and multimedia presentation technologies is not a straightforward issue. The present invention seeks to provide solutions to problems encountered in the combination of FLUTE and SMIL technologies, but also has broader applicability in so far as it can relate to any file delivery and need not be limited to SMIL presentations.

SUMMARY OF THE INVENTION

The invention is as defined in the appended claims.

Embodiments of the invention will now be described, by way of example only, with reference to the accompanying drawings.

DESCRIPTION OF THE EMBODIMENTS

Figure 1:
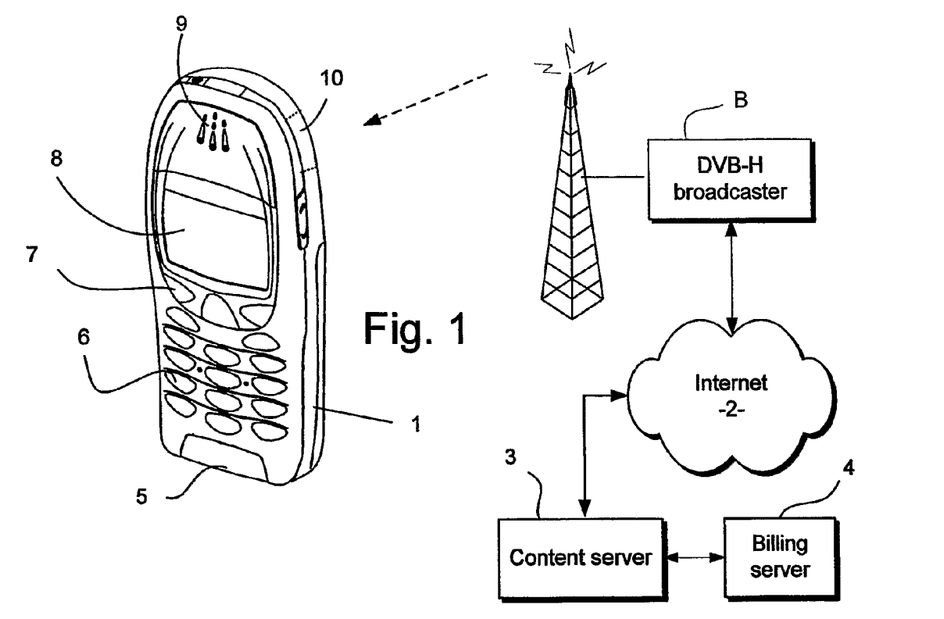
FIG. 1 is a schematic block diagram illustrating a mobile telephone handset which receives data from a server connected through the Internet.

In FIG. 1, a mobile station in the form of a mobile telephone handset 1 receives broadcast data from a DVB-H broadcaster B, which is connected through a network 2, such as the Internet, to a content server 3 that can download data content to the mobile handset 1. The content server 3 has an associated billing server 4 for billing the subscriber for downloaded content.

Figure 2:
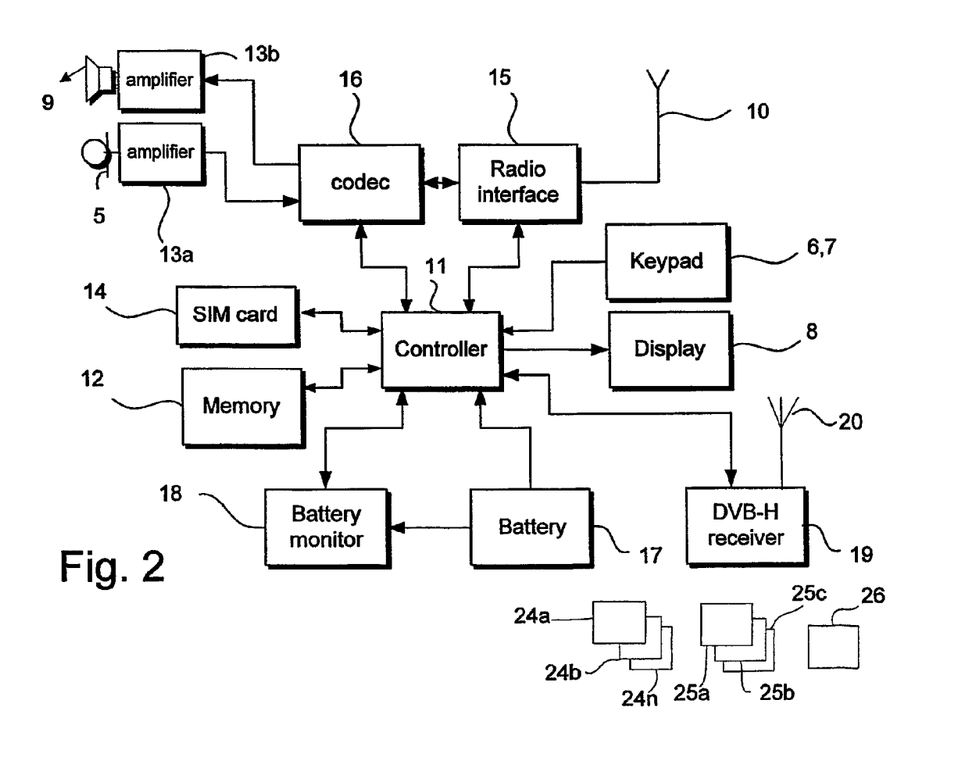
FIG. 2 is a schematic block diagram of the circuitry of the mobile handset shown in FIG. 1.

The handset 1 includes a microphone 5, keypad 6, soft keys 7, a display 8, earpiece 9 and internal antenna 10. The handset 1 is enabled both for voice and data operations. For example, the handset may be configured for use with a GSM network and may be enabled for DVB-H operation, although those skilled in the art will realise other networks and signal communication protocols can be used. Signal processing is carried out under the control of a controller 11. An associated memory 12 comprises a non-volatile, solid state memory of relatively large capacity, in order to store data downloads from the content server 3, such as application programs, video clips, broadcast television services and the like. Electrical analogue audio signals are produced by microphone 5 and amplified by preamplifier 13a.

Similarly, analogue audio signals are fed to the earpiece 9 or to an external headset (not shown) through an amplifier 13b. The controller 11 receives instruction signals from the keypad and soft keys 6, 7 and controls operation of the display 8. Information concerning the identity of the user is held on removable smart card 14. This may take the form of a GSM SIM card that contains the usual GSM international mobile subscriber identity and encryption key $K_i$ that is used for encoding the radio transmission in a manner well known per se. Radio signals are transmitted and received by means of the antenna 10 connected through an rf stage 15 to a codec 16 configured to process signals under the control of the controller 11. Thus, in use, for speech, the codec 16 receives analogue signals from microphone amplifier 13a, digitises them into a form suitable for transmission and feeds them to the rf stage 15 for transmission through the antenna 10 to a PLMN (not shown in FIG. 1). Similarly, signals received from the PLMN are fed through the antenna 10 to be demodulated by the rf stage 15 and fed to codec 16 so as to produce analogue signals fed to the amplifier 13a and earpiece 9.

The handset can be WAP enabled and capable of receiving data for example, over a GPRS channel at a rate of the order of 40 kbit/sec. It will however be understood that the invention is not restricted to any particular data rate or data transport mechanism and for example WCDMA, CDMA, GPRS, EDGE, WLAN, BT, DVB-T, IPDC, DAB, ISDB-T, ATSC, MMS, TCP/IP, UDP/IP or IP, systems could be used.

The handset 1 is driven by a conventional rechargeable battery 17. The charging condition of the battery is monitored by a battery monitor 18 which can monitor the battery voltage and/or the current delivered by the battery 17.

The handset also includes a DVB-H receiver module 19. This receives broadcast signals from the DVB broadcaster B through a DVB antenna 20.

A user of handset 1 can request the downloading of data content from one or more servers such as server 3, for example to download video clips and the like to be replayed and displayed on the display 8. Such downloaded video clips are stored in the memory 12. Also, other data files of differing sizes may be downloaded and stored in the memory 12. Downloading may be user-initiated, or may be allowed by a user on the basis of a setting of the handset. Alternatively, data downloading may be required by an operator of the network 2, particularly as regards software upgrades.

In FLUTE, a file delivery session has a start time and an end time, and involves one or more channels. One or both of the start and end times can be undefined, that is one or both times may not be known by a receiver. If there are plural channels used in a session, these may be parallel, sequential or a mixture of parallel and sequential. A file delivery session carries files as transport objects. When a transport object is provided with semantics, the object becomes a file. Semantics may include name, location, size and type. Each file delivery session carries zero, one or more transport objects (TOs). Each TO is delivered as one or more packets, encapsulated in the underlying protocol. A particular packet may appear several times per session. A particular TO may be delivered using one channel or using several channels. A TO may be transmitted several times.

A special TO, termed File Delivery Table (FDT), signals mapping of a set of files to TOs. There may be several FDTs. Each different FDT can be called an FDT instance. The contents of different FDT instances may or may not overlap. An FDT instance may be empty. FLUTE provides detailed definition of how FDT instances can be used. The reception and processing of the contents of TOs and FDTs will be understood by those skilled in the art, so is not described here.

According to some aspects of the invention, one FDT instance includes an indication that one or more of the described TOs is a file that contains a presentation for some or all files of the session. This allows a presentation to be delivered as a number of separate files using file delivery such as FLUTE. It also allows a receiver to determine which of the files of a delivery session defines the presentation without having to examine the contents of files of the file delivery session to determine which defines the presentation.

In a first embodiment, an additional attribute for a "File" element is defined. This can for example take the form of a new "Presentation" attribute. An example addition to the FDT schema follows:

```
<xs:attribute name="Presentation"
    type="xs:boolean"
    use="optional"/>
```

This defines a new attribute named "Presentation", which is optional and Boolean (i.e. present or not present). Optionally there is also provided:

```
<xs:attribute name="Presentation"
    type="xs:string"
    use="optional"/>
```

This defines optional text for the attribute.

An example FDT instance using this attribute follows:

```
<?xml version="1.0" encoding="UTF-8"?>
<FDT-Instance xmlns:xsi="http://www.w3.org/2001/
XMLSchema-instance"
xmlns:fl="http://www.example.com/flute"
xsi:schemaLocation="http://www.example.com/flute-fdt.xsd"
Expires="2890842807">
    <File
        Content-Location="http://www.example.com/foo.html"
        TOI="1"
        Content-Type="text/html"
        Presentation="true"/>
    <File
        Content-Location="http://www.example.com/tracks/track1.mp3"
        TOI="2"
        Content-Length="6100"
        Content-Type="audio/mp3"
</FDT-Instance>
```

This FDT defines two files. The first is a presentation file, identified as TOI number "1". The fact that it is a presentation file is denoted by the text "Presentation="true"". Its content is text or html, and is located at the specified URL. The second file is an audio/mp3 file of length 6100 and identified as TOI "2". Its content is located at a different, specified, URL.

This FDT can be generated and transmitted in the same way as any other FDT. The difference is that it identifies a TO as being a presentation file. This allows a receiver to be able to determine which of the delivered files is the presentation file merely by examining the contents of the FDT.

Instead of using the attribute "Presentation", in a second embodiment a TO can be identified as a presentation file by using a pre-defined naming convention with the existing "File" attribute. For example, it may be pre-defined that the presence in the field "Content-Location" of the text string "index.html" or "index.smil" denotes that FDT entry to relate to a presentation file. An example FDT instance follows:

```
<?xml version="1.0" encoding="UTF-8"?>
<FDT-Instance xmlns:xsi="http://www.w3.org/2001/
XMLSchema-instance"
xmlns:fl="http://www.example.com/flute"
xsi:schemaLocation="http://www.example.com/flute-fdt.xsd"
Expires="2890842807">
    <File
        Content-Location="http://www.example.com/index.html"
        TOI="1"
        Content-Type="text/html"
    <File
        Content-Location="http://www.example.com/tracks/track1.mp3"
        TOI="2"
        Content-Length="6100"
        Content-Type="audio/mp3"
</FDT-Instance>
```

In this embodiment, the first file mentioned in the FDT includes the text "index.html", which is recognised to relate to a presentation file by a receiver which is aware of the pre-defined text string. This alternative has the advantage that it does not require the definition of a new file attribute. It does however require receivers to be aware of the pre-defined text string or strings before they can determine that an entry in an FDT relates to a presentation file.

In a third embodiment, an FDT instance indicates that there is a set of TOs, with each TO providing an alternative presentation file. In this embodiment, each entry in the FDT which relates to a presentation file includes an additional attribute. This attribute is in this example named "Presentation", as with the first embodiment described above. Instead of merely being a Boolean field though, the "Presentation" field in this embodiment denotes the class of receiver device to which the presentation file relates and/or the type of the content included in the corresponding presentation. An example FDT instance follows:

```
<?xml version="1.0" encoding="UTF-8"?>
<FDT-Instance xmlns:xsi="http://www.w3.org/2001/
XMLSchema-instance"
xmlns:fl="http://www.example.com/flute"
xsi:schemaLocation="http://www.example.com/flute-fdt.xsd"
Expires="2890842807">
    <File
        Content-Location="http://www.example.com/
        menu_class_1.smil"
        TOI="1"
        Content-Type="smil"
        Presentation="TerminalClass_1"/>
    <File
        Content-Location="http://www.example.com/
        menu_class_2.smil"
        TOI="1"
        Content-Type="smil"
        Presentation="TerminalClass_2"/>
    <File
        Content-Location="http://www.example.com/
        menu_text_only.smil"
        TOI="1"
        Content-Type="smil"
        Presentation="TextOnly"/>
    <File
        Content-Location="http://www.example.com/
        tracks/track1.mp3"
        TOI="2"
        Content-Length="6100"
        Content-Type="audio/mp3"
</FDT-Instance>
```

In the example above, three of the four files referred to in the FDT instance relate to presentation files. The first relates to a presentation file which defines a presentation suitable for class one terminals. This presentation file has the URL http://www.example.com/menu_class_1.smil. The second relates to a presentation file which defines a presentation suitable for class two terminals. This presentation file has the URL http://www.example.com/menu_class_2.smil. The third relates to a presentation file which defines a presentation suitable for terminals which are neither class one nor class two but which are operable to render text only files. This presentation file has the URL http://www.example.com/menu_text_only.smil.

The class to which a terminal belongs may depend on a number of factors, for example display size, number of display colours, available plug-ins, etc. It is important only that a receiving terminal can determine to which class it belongs. This may occur by reference to an internal source of information, an external source of information, or by requiring input from a user.

Figure 3:
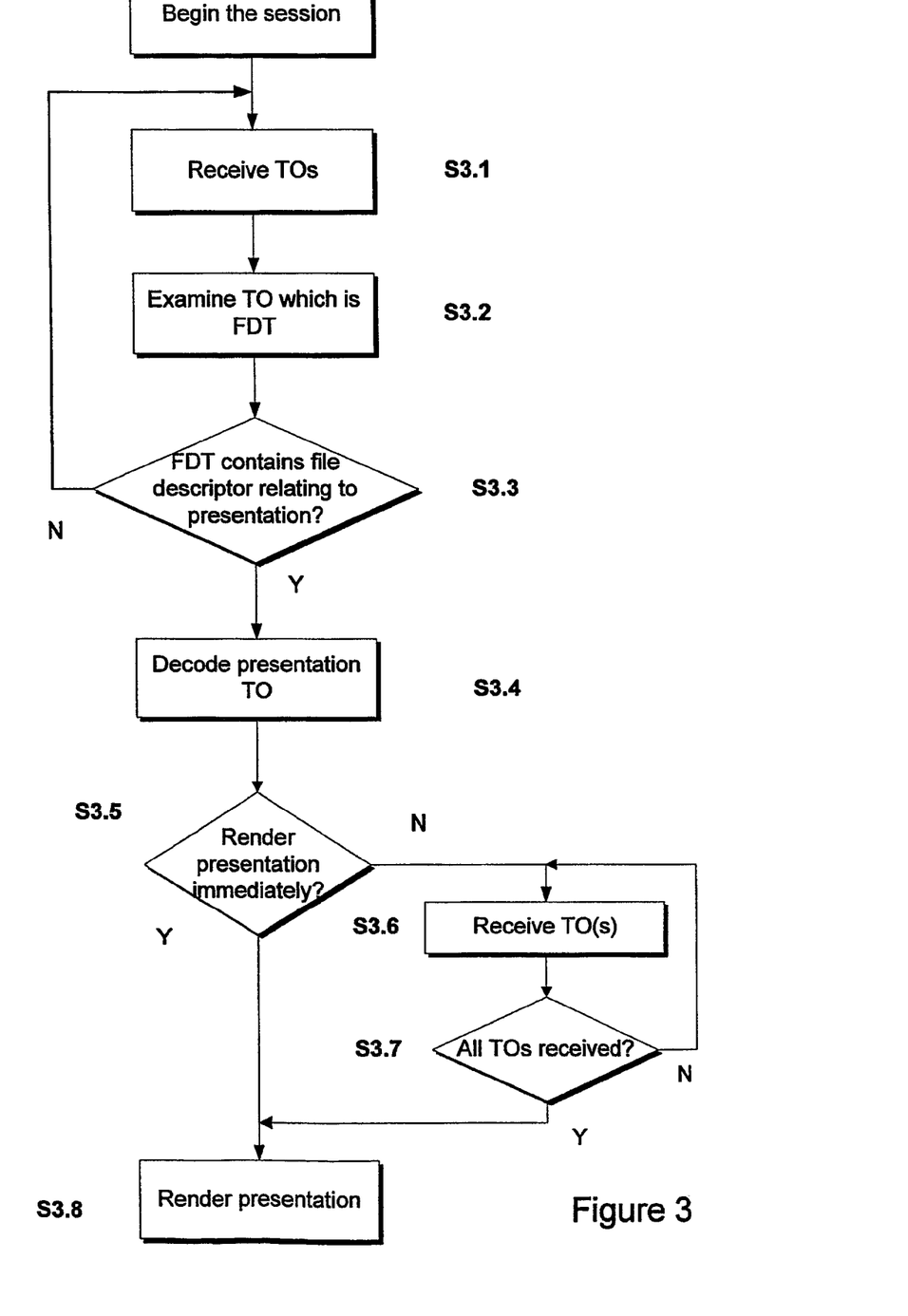
FIGS. 3, 4 and 6 are flowcharts illustrating operation of the FIG. 2 handset in receiving files broadcast as part of a file delivery session according to various embodiments of the invention.

FIG. 3 will now be used to describe operation of the handset 1, generally the DVB-H receiver 19 thereof, when it joins a file delivery session in which FDT instances may be as in either the first or the second embodiment, as described above. This description will be understood to be schematic, and describe only high level operation and to omit error handling provision.

As step S3.1, the receiver 19 receives TOs delivered over FLUTE session. Each TO is analysed in turn, and FDTs are identified therefrom. At step S3.2, an FDT is examined. At step S3.3, it is determined whether the FDT contains a file descriptor relating to a presentation. How this step is performed depends on how presentation file descriptors are identified. If this occurs as in the first embodiment described above, the receiver 19 examines each file descriptor in the FDT to determine whether any includes a "presentation" attribute set to "true", which denotes an FDT entry relating to a presentation file. If the FDTs are as in the second embodiment described above, the receiver 19 examines each file descriptor to determine the presence of the text "index.html" or "index.smil", which denotes an FDT entry relating to a presentation file. If a file descriptor relating to a presentation file is found, operation proceeds to step S3.4. Otherwise, operation returns to receive TOs at step S3.1.

At step S3.4, the TO identified in the file descriptor found to relate to a presentation file is decoded. The receiver 19 knows which is the relevant TO since the TOI number is included in the file descriptor in the FDT. The presentation file defines the presentation, in terms of the files that include the content to be presented and the timing of the presentation of the content of the files. The presentation file may be as described below in relation to the fourth embodiment, in which the presentation file identifies which TOs include files forming part of the content of the presentation.

At step S3.5, the receiver determines whether immediate rendering of the presentation is required. This may involve examining a setting of the receiver 19, for example, or may be determined in any other manner. If the receiver 19 determines that it has received all the TOs referred to in the presentation file, then the receiver in this example determines that immediate rendering of the presentation is required. If immediate presentation is not required, progression is made to step S3.6, where one or more further TOs are received. Following step S3.6, it is determined at step S3.7 whether all the TOs referred to in the presentation file have been received. If not, operation reverts to step S3.6. When all the TOs have been received, or if at step S3.5 it is determined that immediate rendering of the presentation is required, the receiver 19 starts rendering the presentation at step S3.8. If not all the necessary TOs have been received, step S3.8 involves using files in any already received TOs, and progressively using other files as they are received in TOs. An advantage of omitting steps S3.6 and S3.7 is that the receiver 19 can start rendering the presentation as soon any part of the content forming part of the presentation is available. Any other suitable scheme for ensuring that the presentation is effected using the files relating to the presentation may be used in place of the described steps. After the presentation has been rendered, the operation ends.

Figure 4:
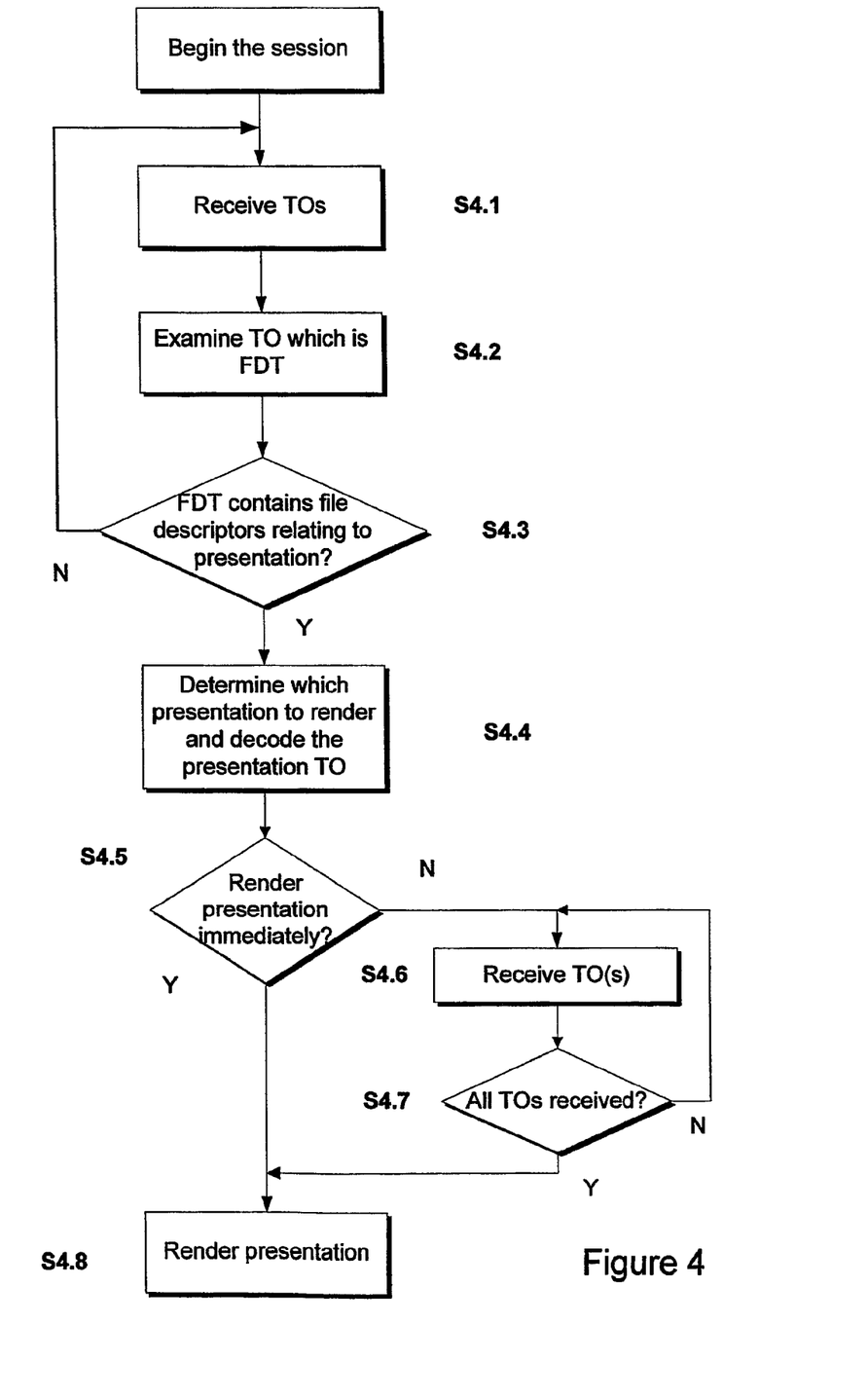

FIG. 4 will now be used to describe operation of the handset 1, generally the DVB-H receiver 19 thereof, when it joins a file delivery session in which FDT instances may be as in the third embodiment, as described above. This description will be understood to be schematic, and describe only high level operation and to omit error handling provision.

As step S4.1, the receiver 19 receives TOs delivered over FLUTE session. Each TO is analysed in turn, and FDTs are identified therefrom. At step S4.2, an FDT is examined. At step S4.3, it is determined whether the FDT contains file descriptors relating to plural presentations. This step is performed by examining each file descriptor in the FDT to determine whether there are plural ones which identify different "presentation" attributes. If file descriptors relating to different presentation files are found, operation proceeds to step S4.4. Otherwise, operation returns to receive TOs at step S4.1.

At step S4.4, the receiver 19 determines which presentation to render. This can occur in any suitable manner. For example, the receiver may know, or alternatively determine by reference to an external information source, to which class it belongs, and select the file descriptor which relates to a presentation file indicated as relating to that class of terminal. This may occur alternatively by presenting the available presentation types on the display of the terminal, and requiring input from a user to select one of the presentation types. Once the receiver 19 has determined which presentation to render, it decodes the TO identified in the corresponding file descriptor as including the presentation file. The receiver 19 knows which is the relevant TO since the TOI number is included in the file descriptor in the FDT. The presentation file defines the presentation, in terms of the files that include the content to be presented and the timing of the presentation of the content of the files. The presentation file may be as described below in relation to the fourth embodiment, in which the presentation file identifies which TOs include files forming part of the content of the presentation.

At step S4.5, the receiver determines whether immediate tendering of the presentation is required. This may involve examining a setting of the receiver 19, for example, or may be determined in any other manner. If the receiver 19 determines that it has received all the TOs referred to in the presentation file, then the receiver in this example determines that immediate rendering of the presentation is required. If immediate presentation is not required, progression is made to step S4.6, where one or more further TOs are received. Following step S4.6, it is determined at step S4.7 whether all the TOs referred to in the presentation file have been received. If not, operation reverts to step S4.6. When all the TOs have been received, or if at step S4.5 it is determined that immediate rendering of the presentation is required, the receiver 19 starts rendering the presentation at step S4.8. If not all the necessary TOs have been received, step S4.8 involves using files in any already received TOs, and progressively using other files as they are received in TOs. An advantage of omitting steps S4.6 and S4.7 is that the receiver 19 can start rendering the presentation as soon any part of the content forming part of the presentation is available. Any other suitable scheme for ensuring that the presentation is effected using the files relating to the presentation may be used in place of the described steps. After the presentation has been rendered, the operation ends.

A receiver may alternatively operate according to a combination of FIGS. 3 and 4. In particular, the FIG. 3 operation may be modified so that step S3.3 determines also whether the FDT contains plural file descriptors relating to presentation files, with step S4.4 of FIG. 4 then being included in parallel to step S3.4 of FIG. 3. Only one of the step S3.4 and S4.4 is then processed, depending on whether the FDT contains plural file descriptors relating to presentation files.

Using this scheme, the receiver 19 knows which file(s) contain the presentation format for the file delivery session.

A fourth embodiment will now be described. This embodiment may involve any of the embodiments described above, or it may be used separately from those embodiments. In the fourth embodiment, a set of files in a file delivery session are related to each other. The set of related files are presented as a logical directory structure. This helps to understand how different players locate the referenced files. For example, it is possible to consider the logical directory as the working directory for a SMIL player.

| Files in directory | Description |
|---|---|
| scene.smil | Scene description file in SMIL language |
| description.sdp | Streaming session description file in SDP format |
| webpage.html | HTML page that refers to files in this directory |
| image222.jpg | JPEG image |
| text-en.dat | Data file |
| other/data/example/ | Hierarchy of directories in this directory |
| directory/file.dat | Any other files |
| etc. | |

In this embodiment, at least one SMIL (or other scene description) file in the directory serves as the scene description. Also, if SMIL is used and a streamed session is referred in the SMIL, at least one SDP (or other session description) file in the directory describes how to access the stream. This is advantageous since it allows the stream to be described in a scene description language. The stream is defined in the presentation file.

The contents of an example "scene.smil" file follow:

```
<smil xmlns="http://www.w3.org/2001/SMIL20/Language">
    <head>
        <layout type="text/smil-basic-layout">
            <region id="av" top="0px" left="50px" height="100px" width="100px"/>
            <region id="text" top="100px" left="50px" height="10px" width="100px"/>
            <region id="sync" top="0px" left="0px" height="110px" width="50px"/>
        </layout>
    </head>
    <body>
        <par>
            <stream src="description.sdp" region="av"/>              ##1
            <textstream src="text-description.sdp" region="text"/>   ##2
            <subtitle src="text-en.dat" region="text"/>              ##3
            <text src="webpage_only_text.dat" start="0s" stop="5s" region="sync"/>
            <text src="webpage_with_image123.dat" start="5s" stop="10s" region="sync"/>
            <image src="image123.jpg" start="10s" stop="15s" region="sync"/>
        </par>
    </body>
</smil>
```

This constitutes a presentation file, as is mentioned above in relation to the first to third embodiments. The 'par' part of the file defines content and the times at which the content is to be rendered. For example, the content of the file "webpage_only_text.dat" is defined to start being rendered at "0s" and to stop being rendered at "5s". Also, the content of the file "webpage_with_image123.dat" it to be rendered from "5s" to "10s". Lastly, the content of file "image123.jpg" is to be rendered from "10s" to "15s".

Figure 5:
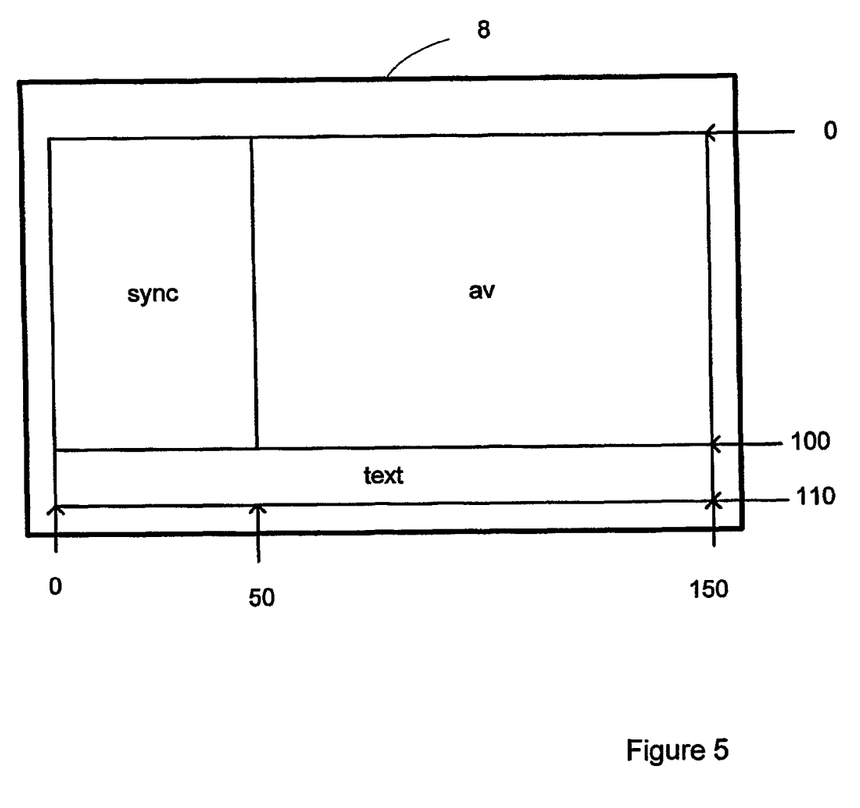
FIG. 5 illustrates how a display of the display of the FIG. 1 handset can be divided according to certain embodiments of the invention.

This presentation file differs from conventional files in that it also defines where in a display the content is to be rendered. In particular, the 'head' part of the file defines a layout of a display, and divides it into three regions: region "av" extends up to pixel 0, rightwards from pixel 50 and is 100 pixels high and 100 pixels wide; region "text" extends up to pixel 100, rightwards from pixel 50 and is 10 pixels high and 100 pixels wide; and region "sync" extends up to pixel 0, rightwards from pixel 0 and is 110 pixels high and 50 pixels wide. This is illustrated in FIG. 5.

In this example file, the lines of SMIL indicated by ##1, ##2 and ##3 are alternatives. Line ##1 is used if subtitles are to be integrated by player; line ##2 is used if subtitles are a separate parallel RTP-stream, and there is a separate player; and line ##3 is used if subtitles are delivered in a file and played-out by the SMIL player. Some or all of these lines may be transmitted, depending on the specific implementation.

The presentation file may be dynamic, i.e. it may change during a streaming session.

The "scene.smil" file may also define different display layouts, and define when in the presentation the different display layouts are operative. Thus, the scene may be dynamic, and be altered as the presentation progresses so as to allow the areas of the display at which the content is rendered to vary from a given template or layout during the presentation.

Example contents of an "description.sdp" file follow. This example SDP describes an audio-visual streamed session that could be delivered in a purely unidirectional way. In order to receive the session, a client needs only this file. IPv6 (Internet Protocol version 6) addresses are used as an example.

```
v=0
a=ApplicationType:video
a=Height:integer;116
a=LiveStream:integer;1
a=StreamCount:integer;2
a=Width:integer;152
a=ASMRuleBook:string;"#($Bandwidth >=0),Stream0Bandwidth = 8000,
Stream1Bandwidth = 12000;"
m=audio 11006 RTP/AVP 101
c=IN IP6 FF15::1:1
b=AS:8
a=control:streamid=0
a=length:npt=0
a=rtpmap:101 x-pn-realaudio/1000
a=mimetype:string;"audio/x-pn-realaudio"
a=AvgBitRate:integer;8000
a=AvgPacketSize:integer;288
a=EndTime:integer;0
a=LiveStream:integer;1
a=MaxBitRate:integer;8000
a=MaxPacketSize:integer;288
a=Preroll:integer;4608
a=StreamId:integer;0
a=OpaqueData:buffer;"LnJh/QAFAAAucmE1AAAAEAAFAAAARgAAAABIAA
AAAAAAOpgAAAAAAAIASAAIAAAAAAfQAAAH0AAAAAQAAFnZW5yY29va29va
wEHAAAAAAAIAQAAAQEAAAw="
a=RMFF 1.0 Flags:buffer;"AAIAAgAA"
a=ASMRuleBook:string;"priority=5,averagebandwidth=8000,
PNMKeyFrameRule=T;priority=5,averagebandwidth=0,
PNMNonKeyFrameRule=T,OnDepend=\"0\",O
ffDepend=\"0\";"
a=StreamName:string;"Audio Stream"
m=video 11008 RTP/AYP 101
c=IN IP6 FFI5::1:2
b=AS:12
a=control:streamid=1
a=length:npt=0
a=rtpmap:101 x-pn-realvideo/1000
a=mimetype:string;"video/x-pn-realvideo"
a=AvgBitRate:integer;12000
a=AvgPacketSize:integer;430
a=LiveStream:integer;1
a=MaxBitRate:integer;12000
a=MaxPacketSize:integer;607
a=Preroll:integer;4562
a=StreamId:integer;1
a=OpaqueData:buffer;"AAAAJFZJRE9SVjMwAJgAdAAMAAAAAAAPAAAASRA
wMCAwAiYd"
a=RMFF 1.0 Flags:buffer;"AAMAAgAAAAI="
a=ASMRuleBook:string;"#($Bandwidth>=12000),priority=9,averagebandwidth=12
000,PNMKeyFrameRule=T;#($Bandwidth=12000),OnDepend=\"0\",priority=5,
averagebandwidth=0,PNMNonKeyFrameRule=T;#($Bandwidth<2000),priority=9,
timestampdelivery=T,DropByN=T,PNMThinningRule=T;"
a=StreamName:string;"Video Stream"
```

The contents of the logical directory need to be delivered to the client end system. There may be for example broadcast delivery, for example using FLUTE, or fetch delivery, for example using HTTP. Any other suitable mode of delivery may be used instead.

Broadcast delivery of the contents of the logical directory using FLUTE may occur for example through the broadcast of TOs as follows:

| File | Description | TOI no. | Content of TO |
|---|---|---|---|
| | | 0 | FDT |
| scene.smil | Scene description SMIL | 1 | www.example.com/movies/data/scene.smil content-type: text/html |
| description.sdp | Streaming session description file in SDP | 2 | www.example.com/movies/data/description.sdp content-type: application/sdp |
| webpage.html | HTML page | 3 | www.example.com/movies/data/webpage.html (synchronized web page; ref. from .smil) |
| image123.jpg | JPEG image | 4 | www.example.com/movies/data/image123.jpg (synchronized image; ref. from .smil or .html) content-type: image/jpg |
| text-en.dat | Data file | 5 | www.example.com/movies/data/text-en.dat (subtitling block, English) |
| file.dat | Hierarchy of directories in this directory | N | www.anyhost.com/file.dat (any other file to be referenced) |

In this case, one FDT includes a file descriptor for a TO containing a presentation file, for example the scene.smil file above. This is related to a file descriptor for a TO which includes the file.dat file. The relationship between these file descriptors may take any suitable form, as long as a receiver can determine that the two file descriptors are related to each other. For example, the two file descriptors may be included adjacent each other in the same FDT. If there are plural file descriptors relating to presentation files in a given FDT, each may be adjacent, for example immediately followed by, its respective file.dat file descriptor.

Figure 6:
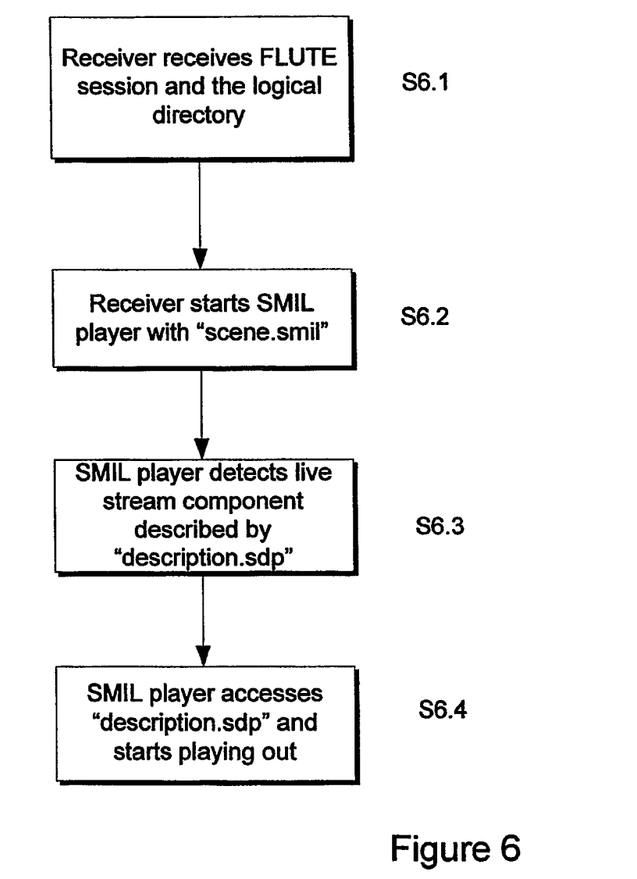

Operation of the receiver 19 in rendering a presentation delivered using FLUTE will now be described with reference to FIG. 6.

At step S6.1, the receiver 19 receives the files constituting a FLUTE session and the logical directory. This involves examining the contents of one or more FDTs received as part of the session. A file descriptor in an FDT relating to a presentation which is required to be rendered is examined, and the associated file.dat file descriptor also is examined. From these file descriptors, the TOs which include the presentation file and the logical file directory for the files needed to render that presentation can be identified. The receiver 19 can then determine which transmitted TOs are required to be received and decoded by finding the file descriptors in FDTs which include the files listed in the file.dat file and identifying the relevant TOs from those file descriptors. Thus, the receiver 19 does not need to analyse TOs other than FDTs and the TOs which carry the required files.

At step S6.2, the receiver 19 starts its SMIL player (which is a software application running in the receiver hardware 19) with the "scene.smil" file. The scene.smil file refers to the description.sdp file, as shown above, as being the stream source for the "av" region of the display 8. The SMIL player at step S6.3 detects a live stream component described by "description.sdp". At step S6.4, the SMIL player accesses "description.sdp" and starts playing out the presentation content. Content is always presented on the display 8 in the area defined for that content in the "scene.smil" file.

Using SMIL, the rendering of other elements can be synchronised. For example, at time "5s" the "webpage_with_image123.dat" is rendered in the "sync" region of the display 8. This involves referring from HTML an image (image123.jpg). To do this, a tendering engine accesses the local file before producing the web page, synchronously with other SMIL components if the presentation file defines this.

If instead delivery is to be a fetch delivery using HTTP, this may involve the following. Firstly, there may be sent from the client to the server the HTTP command:
GET www.example.com/movies/movie-sample This may then be followed by the sending from the server to the client of the HTTP response:

```
200 OK
Content-Type: Multipart/Related; boundary=example98203804805
-example98203804805
Content-Location: www.example.com/movies/data/scene.smil
Content-Length: ? ? ?
Content-Type: text/html
<<Resource data for scene.smil>>
-example98203804805
Content-Location: www.example.com/movies/data/description.sdp
Content-Length: ? ? ?
Content-Type: application/sdp
<<Resource data for description.sdp>>
-example98203804805
etc. for webpage.html, image123.jpg, . . .
-example98203804805
```

Operation of the receiver in this instance will be understood so is not described in detail here.

The use of file directories as shown above is particularly advantageous when there are plural presentation files, whether or not there are plural files intended for different terminal classes as with the third embodiment described above. In this case, the presentation file which is chosen and then accessed by a receiver 19 is associated with a file "file.dat" which identifies the logical directory of files required in rendering that presentation. This allows a receiver 19 to find the TOs and files which do relate to the presentation which is to be rendered, and to ignore more effectively TOs and files which do not relate to the presentation which is to be rendered.

Many other modifications and variations of the described system are possible. For example whilst the invention has been described in relation to a mobile telecommunications handset, particularly a mobile telephone, it is applicable to other apparatus useable to receive files in delivery sessions. Transmission may be over-the-air, through DVB or other digital system. Transmission may instead be through a telephone or other wired connection to a fixed network, for example to a PC or server computer or other apparatus through an Internet multicast. Although SMIL is used above to define presentations, any other language or technique could be used instead. Such may be a publicly available standard, or may be proprietary. One standard which may be used is Timed Interactive Multimedia Extensions for HTML (HTML+TIME), which extends SMIL into the Web Browser environment. HTML+TIME includes timing and interactivity extensions for HTML, as well as the addition of several new tags to support specific features described in SMIL 1.0. HTML+TIME also adds some extensions to the timing and synchronization model, appropriate to the Web browser domain. HTML+TIME also introduces a number of extensions to SMIL for flexibility and control purposes. An Object Model is described for HTML+TIME.

Although the embodiments are described in relation to IPDC over DVB-H, the invention can be applied to any system capable in supporting one-to-one (unicast), one-to-many (broadcast) or many-to-many (multicast) packet transport. Also, the bearer of the communication system may be natively unidirectional (such as DVB-T/S/C/H, DAB) or bi-directional (such as GPRS, UMTS, MBMS, BCMCS, WLAN, etc.). Data packets may be IPv4 or IPv6 packets, although the invention is not restricted to these packet types.

The invention claimed is:

1. A method comprising:
sending plural transport objects each including content;
sending one or more presentation objects including instructions for providing a presentation of the content of one or more of the plural transport objects; and
sending a delivery object which lists at least one of the plural transport objects and indicates the content of each of said at least one of the plural transport object, the delivery object including data identifying the one or more presentation objects,
wherein the instructions for providing the presentation of the content of said one or more of the plural transport objects comprise a start time and an end time for the presentation of the content of each of said one or more of the plural transport objects, and
wherein the instructions for providing the presentation of the content of said one or more of the plural transport objects further comprise a receiver class identifier indicating a group of targeted receivers that have particular receiver capability factors.

2. The method of claim 1, wherein the plural transport objects are part of a file delivery session.

3. The method of claim 1, wherein each of the plural transport objects is sent as one or more packets, encapsulated in an underlying protocol.

4. The method of claim 1, wherein the plural transport objects are sent using at least one channel.

5. The method of claim 1, wherein the particular receiver capability factors include at least one of the following: a display size a receiver must have to belong to the group of targeted receivers, a number of display colors a receiver must have to belong to the group of targeted receivers, or one or more available plug-ins a receiver must have to belong to the group of targeted receivers.

6. An apparatus comprising
a controller; and
memory storing software instructions that, with the controller, cause the apparatus to at least:
send plural transport objects each including content;
send one or more presentation objects including instructions for providing a presentation of the content of one or more of the plural transport objects; and
send a delivery object which lists at least one of the plural transport objects and indicates the content of each of said at least one of the plural transport object, the delivery object including data identifying the one or more presentation objects,
wherein the instructions for providing the presentation of the content of said one or more of the plural transport objects comprise a start time and an end time for the presentation of the content of said one or more of the plural transport objects, and
wherein the instructions for providing the presentation of the content of said one or more of the plural transport objects further comprise a receiver class identifier indicating a group of targeted receivers that have particular receiver capability factors.

7. An apparatus as claimed in claim 6, wherein the memory further stores software instructions that, with the controller, cause the apparatus to:
define a presentation for remote rendering by defining at least two regions of a display;
associate each region with a region identifier; and
associate at least one of the region identifiers with at least one content file.

8. The apparatus of claim 6, wherein the plural transport objects are part of a file delivery session.

9. The apparatus of claim 6, wherein each of the plural transport objects is sent as one or more packets, encapsulated in an underlying protocol.

10. The apparatus of claim 6, wherein the plural transport objects are sent using at least one channel.

11. The apparatus of claim 6, wherein the particular receiver capability factors include at least one of the following: a display size a receiver must have to belong to the group of targeted receivers, a number of display colors a receiver must have to belong to the group of targeted receivers, or one or more available plug-ins a receiver must have to belong to the group of targeted receivers.

12. An apparatus comprising:
a controller; and
a memory storing software instructions that, with the controller, cause the apparatus to at least:
receive plural transport objects each including content;
receive one or more presentation objects including instructions for providing a presentation of the content of one or more of the plural transport objects, the instructions for providing the presentation of the content of the one or more of the plural transport objects comprising a start time and an end time for the presentation of the content of said one or more of the plural transport objects and a receiver class identifier indicating a group of targeted receivers that have particular receiver capability factors;
receive a delivery object, the delivery object listing at least one of the plural transport objects and indicating the content of each of said at least one of the plural transport objects, the delivery object including data identifying the one or more presentation objects;

determine from the delivery object the identity of said at least one of the plural transport objects and an indication of the content of each of said at least one of the plural transport objects;

determine from the delivery object the identity of one of the one or more presentation objects;

in response to receiving plural presentation objects, select one of the plural presentation objects at least partly based on the receiver class identifier, resulting in a selected presentation object; and provide a presentation of the content of said one or more of the plural transport objects as defined by the selected presentation object.

13. The apparatus of claim 12, wherein the plural transport objects are part of a file delivery session.

14. The apparatus of claim 12, wherein each of the plural transport objects is received as one or more packets, encapsulated in an underlying protocol.

15. The apparatus of claim 12, wherein the plural transport objects are received via at least one channel.

16. A method comprising:

receiving plural transport objects each including content;

receiving one or more presentation objects including instructions for providing a presentation of the content of one or more of the plural transport objects, the instructions for providing the presentation of the content of said one or more of the plural transport objects comprising a start time and an end time for the presentation of the content of said one or more of the plural transport objects and a receiver class identifier indicating a group of targeted receivers that have particular receiver capability factors;

receiving a delivery object, the delivery object listing at least one of the plural transport objects and indicating the content of each of said at least one of the plural transport objects, the delivery object including data identifying the one or more presentation objects;

determining, by a controller, from the delivery object the identity of said at least one of the plural transport objects and an indication of the content of each of said at least one of the plural transport objects;

determining from the delivery object the identity of one of the one or more presentation objects;

in response to receiving plural presentation objects, selecting one of the plural presentation objects at least partly based on the terminal class identifier, resulting in a selected presentation object; and providing a presentation of the content of said one or more of the plural transport objects as defined by the selected presentation object.

17. The method of claim 16, wherein the plural transport objects are part of a file delivery session.

18. The method of claim 16, wherein each of the plural transport objects is received as one or more packets, encapsulated in an underlying protocol.

19. The method of claim 16, wherein the plural transport objects are received via at least one channel.

20. The method of claim 16, wherein the particular receiver capability factors include at least one of the following: a display size a receiver must have to belong to the group of targeted receivers, a number of display colors a receiver must have to belong to the group of targeted receivers, or one or more available plug-ins a receiver must have to belong to the group of targeted receivers.

\* \* \* \* \*